United States Patent [19]
De La Mater et al.

[11] 3,856,673
[45] Dec. 24, 1974

[54] PURIFICATION OF SPENT SULFURIC ACID

[75] Inventors: George B. De La Mater, Media; Barton Milligan, Ardmore, both of Pa.

[73] Assignee: Air Products and Chemical, Inc., Wayne, Pa.

[22] Filed: Apr. 2, 1973

[21] Appl. No.: 347,219

[52] U.S. Cl. .................................. 210/63, 423/531
[51] Int. Cl. .............................................. C02b 1/36
[58] Field of Search .................. 210/48, 50, 62, 63; 423/522, 525, 531

[56] References Cited
UNITED STATES PATENTS

| | | | |
|---|---|---|---|
| 2,313,910 | 3/1943 | Archibald | 423/531 |
| 2,348,328 | 5/1944 | Chapman et al. | 423/531 |
| 3,477,814 | 11/1969 | Wilson | 423/525 |
| 3,715,309 | 2/1973 | Zumbrunn | 210/63 |

FOREIGN PATENTS OR APPLICATIONS

| | | | |
|---|---|---|---|
| 577,324 | 6/1959 | Canada | 423/531 |

*Primary Examiner*—Samih N. Zaharna
*Assistant Examiner*—Peter A. Hruskoci
*Attorney, Agent, or Firm*—Barry Moyerman; Richard A. Dannells, Jr.

[57] ABSTRACT

A process for purifying a spent acid stream containing organic impurities and at least 60 percent by weight of sulfuric acid comprises admixing the stream with ozone, hydrogen peroxide, peroxydisulfates or chlorates and recovering a purified acid stream containing substantially less of the organic impurities than the spent stream. The process has particular utility in the removal of the nonvolatile organic impurities contained in spent sulfuric acid from the nitration of aromatic hydrocarbons.

6 Claims, 1 Drawing Figure

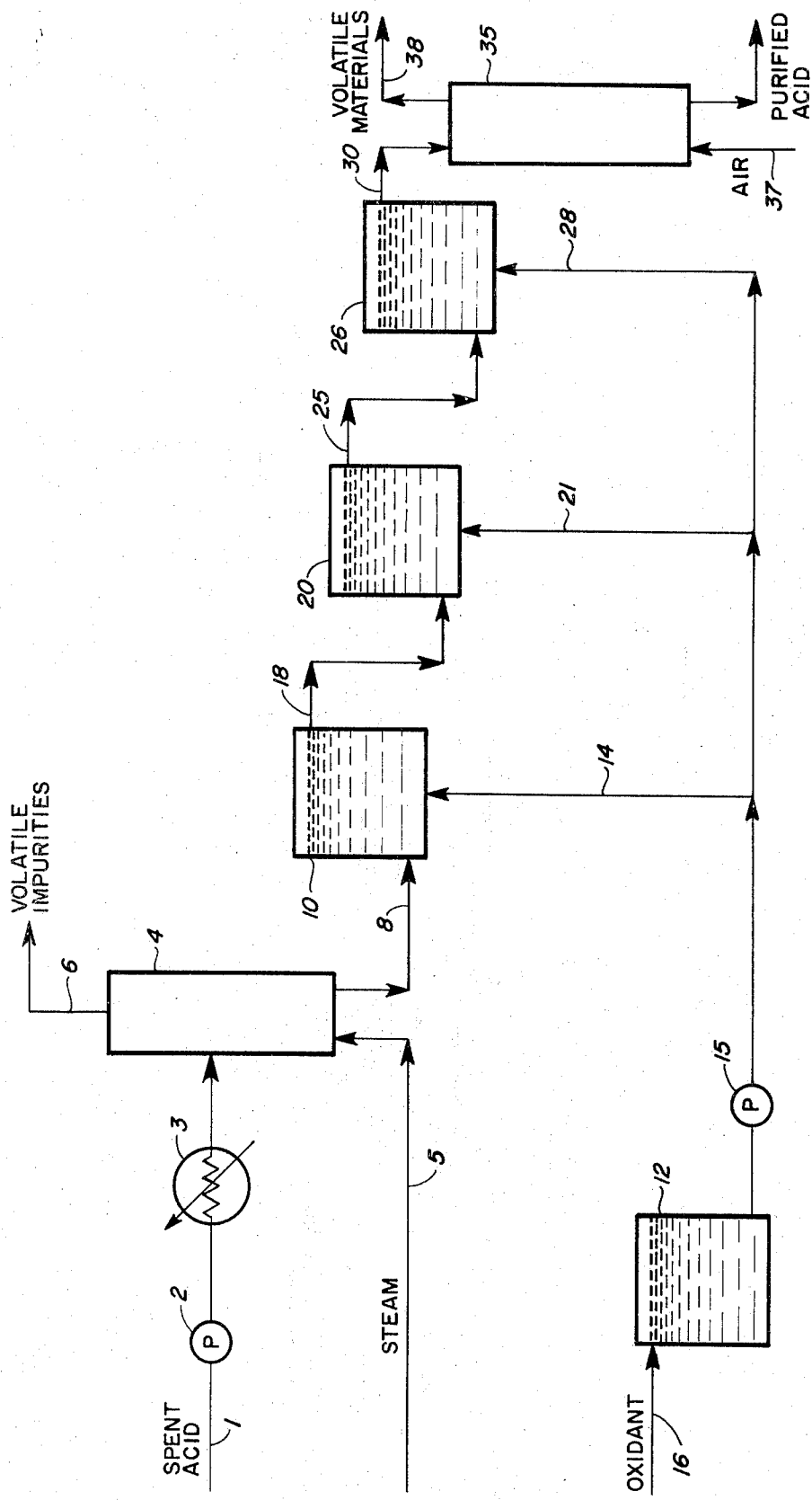

PURIFICATION OF SPENT SULFURIC ACID

BACKGROUND OF THE INVENTION

1. Field of the Invention

This invention is directed to a process for the purification of sulfuric acid in a spent acid stream containing organic impurities. More particularly, it is directed to a process for removing from a spent acid stream containing at least 60 percent by weight of sulfuric acid substantially all nonvolatile organic impurities which remain after conventional stripping techniques.

2. Prior Art

Sulfuric acid used in the production of many organic compounds contains inorganic and organic impurities, a portion of which must be removed so that acid can be reused in the process. The conventional methods for removal of impurities comprisies heating the spent sulfuric acid to its boiling point and stripping the acid with hot gases such as steam, air or nitrogen. Such methods are effective in removing substantially all of the volatile organic impurities and the inorganic impurities, e.g. $O_2$, $N_2$, $NO_2$, $SO_2$, $CO_2$, $CL_2$, and the like, which are found in the production of organic products. The stripped acid must then either be fortified with oleum or otherwise concentrated to restore the acid stream to the desired concentration for the particular process involved. The stripped and reconcentrated acid is then recylced to the process. Such prior art techniques result in a build-up of nonvolatile organic impurities in the acid recycle which must be bled from the process. This leads to disposal problems which are a great hazard to the environment.

SUMMARY OF THE INVENTION

In contrast to the prior art methods, the process of the present invention is designed to remove substantially all of the nonvolatile impurities that remain in a spent acid stream from the production of organic compounds. The resulting purified acid can either be concentrated and recycled to the production process or be utlized in its dilute state in other processes that do not require the higher concentration.

In accordance with the present invention, a process is provided for purifying a spent acid stream containing organic impurities and at least 60 percent of sulfuric acid which comprises the steps of admixing the stream with an oxidizing agent selected from the group consisting of ozone, hydrogen peroxide, peroxydisulfates, chlorates and mixtures thereof and recovering a purified acid stream containing substantially less of the organic impurities than said spent stream. At least one stoichiometric equivalent of the oxidizing agent per equivalent of the organic impurity is added during the contacting step if complete removal is required. Lesser amounts can be used if complete removal of the organic impurities is not necessary. A stoichiometric equivalent of oxidant is the theoretical amount of oxidant required to obtain complete oxidation of impurities. This amount can be calculated by balancing an oxidizing equation between the particular impurity or impurities involved and the oxidant.

A spent acid stream recovered as an effluent from the nitration of aromatic hydrocarbons, e.g. toluene, contains about 60 to about 85 percent by weight sulfuric acid and up to about 5 percent by weight of total impurities. Kouba et al., U.S. Pat. No. 2,951,746 provides a description of a process in which toluene is nitrated in the presence of a nitrating acid containing about 60 percent to about 85 percent sulfuric acid, about 10 percent to about 30 percent nitric acid and about 3 percent to about 16 percent water. The volatile inorganic and organic impurities from such a process include nitrogen oxides, toluene, mononitrotoluene and dinitrotoluene. These impurities can easily be removed by stripping techniques as indicated above. The stripped acid can then be concentrated to the desired nitrating acid stream for the nitration process in a concentrator by bubbling a heated gas, e.g. air, through the acid. The concentrated acid is then recycled to the process. After steady state conditions have been achieved in the plant, the nonvolatile organic impurities which include nitrocresols and other nitrophenolic compounds build up to a concentration of 200 ppm or more. Such a high concentration of impurities can be detrimental to the process, and thus a bleed stream of stripped acid has to be replaced by fresh acid. The removal of the bleed stream results in waste disposal problems especially in view of the more stringent environmental control procedures. It has been found that if at least a portion of the effulent from such a process is treated by means of the process of the present invention, the concentration of the nonvolatile organic impurities does not increase to a detrimental level and a bleed stream need not be taken.

Ordinary oxidizing agents such as oxygen, air, nitric acid, dinitrogen tetroxide and potassium perchlorate have not been found to be effective to oxidize these nonvolatile organic impurities. It has been discovered that if at least one stoichiometric equivalent of an oxidizing agent selected from the group consisting of ozone, hydrogen peroxide, sodium and potassium peroxydisulfates, sodium and potassium chlorates and mixtures thereof is contacted with the stripped spent acid stream per equivalent of impurity for a period of about one minute to about 60 minutes at a temperature of about 130° to 230°C., the concentration of the nonvolatile organic impurities in the spent acid stream is reduced by at least 50 wt. percent.

The hydrogen peroxide can be added to the spent acid contactor having the concentration as received, i.e., about 50 percent by weight or it can be diluted with water or other suitable solvent to a desired level for handling if the concentration is too high. Ozone can be generated on the plant site and added directly to the contactor or it too can contain a suitable diluent, e.g. air. The peroxydisulfates and chlorates are usually added to the contactor in the form of a dilute aqueous solution.

BRIEF DESCRIPTION OF THE DRAWING

The drawing represents a simplified illustration of one embodiment of the process units and flow paths suitable for carrying out in a continuous operation the process of the present invention.

DESCRIPTION OF THE PREFERRED EMBODIMENTS OF THIS INVENTION

Referring now to the drawing in detail, a spent sulfuric acid stream from a dinitrotoluene plant containing about 73 percent by weight sulfuric acid and about 1 wt. percent of total impurities including at least 75 ppm of nonvolatile organic impurities, primarly nitrocresols, is pumped into the system through line 1 via pump 2. The spend acid stream is heated in heat exchanger 3 to its boiling point at the ambient pressure conditions and is passed into stripper 4. The spent acid is stripped with steam introduced through line 5 at the bottom of stripper 4 and the volatile organic and inorganic impurities are removed from the top of the column through line 6. The stripped acid is continuously removed from the bottom of the column through line 8 and passed to first treater 10 where the acid is contacted with a dilute aqueous solution of hydrogen peroxide (10 wt. percent) from storage tank 12 via line 14 by means of pump 15. The solution of oxidant is periodically added via line 16 to replenish the supply in tank 12. The acid stream is removed from the top of treater 10 and passed by gravity through line 18 and introduced near the bottom of second treater 20 adjacent to the point of entry of the dilute solution of oxidant which passes through line 21. Similarly, the treated acid is removed from the top or second treater 20 and passed via line 25 to third treater 26 where the acid is again treated with the dilute solution of oxidizing agent passing through line 28. The total period the oxidant is in contact with the spent acid is from about 1 minute to about 30 minutes and at least one stoichiometric equivalent of the oxidant is present per equivalent of the impurity. This period can be extended. However, most of the oxidation of the impurities occurs during its initial contact with the oxidant.

The treated acid from third treater 26 is optionally passed through line 30 into the top of stripper 35 where the volatile materials formed during the oxidation reaction can be removed by means of air introduced into the bottom of stripper 35 via line 37. The volatile materials in this embodiment are removed from the top of the column via line 38. In actual practice it has been found that the type of volatiles produced during the purification process are such that they are easily separated from the acid by purging with air or by simply allowing the acid to be exposed to the atmosphere.

The purified acid stream containing less than 25 ppm of organic impurities is removed from the bottom of stripper 35. The purified acid still containing about 70 wt. percent sulfuric acid can be concentrated to about 90 wt. percent sulfuric acid by the evaporation of water or by the addition of oleum or concentrated sulfuric acid and recycled to the nitrator in the dinitrotoluene plant. However, if possible, it is preferred that the purified acid be utilized in a process requiring a less concentrated sulfuric acid such as in the production of phosphoric acid or fertilizer.

The following examples further illustrate the process of the present invention.

EXAMPLE 1

The example demonstrates the use of ozone as the oxidant in carrying out the present process in a batch operation. Two 200 gram samples of stripped spent acid containing 73 by weight percent sulfuric acid and about 90 ppm of nonvolatile organic impurities were each treated with 1.25 stoichiometric equivalents of ozone per equivalent of impurities at the boiling point of the acid, e.g. 1802 C., for periods of 1 hour and 2¼ hours respectively. The treated acid samples were found on analysis to contain 24 ppm and 7 ppm of novolatile organic impurities, respectively.

Control 1

A sample of the stripped spent sulfuric acid used in Example 1 was treated for five hours at 180°C with air as the oxidant at a pressure of 810 p.s.i.g. in a glass-lined stainless steel autoclave. After this long period the acid still contained 70 ppm of nonvolatile impurities.

EXAMPLE 2

A sample of a spent sulfuric acid stream obtained from a dinitrotoluene plant was steam stripped on a laboratory scale to remove substantially all of the mononitrotoluene and dinitrotoluene and was analyzed to contain approximately 91 ppm of nitrocresols. The stoichiometric equivalent of hydrogen peroxide used to treat this sample was calculated from the following balanced equations:

$C_7H_7NO_3 + 17 H_2O_2 \rightarrow 7CO_2 + 20 H_2O + HNO_3$
(mononitrocresols)

Therefore, one stoichiometric equivalent of hydrogen peroxide equals:

$(17 \times 34)/153 = 3.77(g.H_2O_2)/(g.\ nitrocresols)$

The sample of spent acid at or substantially near its boiling point of about 180°C was treated in a round bottomed flask in the presence of 5 percent by wt. aqueous solution of hydrogen peroxide which was added to the flask at a rate of 0.55 stoichiometric equivalents of the peroxide per equivalent of nitrocresols per hour. The results are set forth in Table I below:

TABLE I

CONTINUOUS ADDITION OF $H_2O_2$

| Equivalents of $H_2O_2$ added | Amount of nitrocresols in spent sulfuric acid [1] | |
| --- | --- | --- |
| | % | ppm |
| 0 | 100 | 91 |
| 0.78 | 50 | 45.5 |
| 1.12 | 24 | 21.8 |
| 1.69 | 20 | 18.2 |

[1] Based on a determination of the total carbon in the acid.

The results indicate that if at least about one stoichiometric equivalent of hydrogen peroxide is contacted with the spent acid, the amount of nitrocresols that remain in the spent acid is less than 50 percent by wt. of the initial amount, or in this example, less than 25 ppm.

EXAMPLE 3

One stoichiometric equivalent of potassium chlorate as a 5 percent by wt. aqueous solution was added to a boiling sample of the steam stripped spent acid Example 2. After a period of 20 minutes, the nitrocresol content of the purified acid was 41 percent of the initial value or about 39 ppm based on the total carbon content of the acid. The treating period was extended for several hours without any further apparent decrease in the nitrocresol content of the acid.

Control 2

When potassium perchlorate was substituted as the oxidant for potassium chlorate under the same conditions set forth in Example 3, 2.5 equivalents of the oxidant per equivalent of the impurity were required for 50 wt. percent reduction in the amount of nonvolatile organic impurities in the purified acid.

EXAMPLE 4

The steps of Example 3 were repeated except that instead of adding one stoichiometric equivalent of the 5 percent by wt. solution of potassium chlorate in a single portion to the boiling acid, one third of an equivalent of the chlorate was added to the acid per equivalent of nitrocresols every 20 minutes for a total period of 80 minutes. The results of this incremental treatment is set forth in Table II below:

TABLE II

INCREMENTAL ADDITION OF $KClO_3$

| Equivalents of $KClO_3$ added | Amount of nitrocresols in spent sulfuric acid[1] | |
|---|---|---|
| | % | ppm |
| 0 | 100 | 91 |
| 0.33 | 33 | 30 |
| 0.67 | 13 | 11.8 |
| 1.00 | 11 | 10 |
| 1.33 | 8 | 7.3 |

[1] Based on a colorimetric measurement of the nitrocresols as their sodium salts.

The colorimetric determination is a convenient method of measuring the destruction of the nitrocresol impurities in the acid. However, this test tends to give erroneously low values because the chromophores appear to be oxidized more rapidly by sodium chlorate than the aromatic nucleus.

EXAMPLE 5

The steps of Example 3 were again repeated except that instead of one-shot addition of the oxidant, the 5 percent by wt. solution of potassium chlorate was continuously added to the boiling acid throughout the treatment period at a rate of 1.5 stoichiometric equivalents per equivalent of nitrocresols per hour. The results of this continuous treatment are set forth in Table III below:

TABLE III

CONTINUOUS ADDITION OF $KClO_3$

| Equivalents of $KClO_3$ added | Amount of nitrocresols in spent sulfuric acid[1] | |
|---|---|---|
| | % | ppm |
| 0 | 100 | 91 |
| 0.16 | 86 | 78.3 |
| 0.48 | 61 | 55.5 |
| 0.80 | 37 | 33.7 |
| 1.12 | 31 | 28.2 |
| 1.44 | 22 | 20 |

[1] Based on a determination of the total carbon in the acid.

The results of Tables II and III indicate that the incremental and continuous additions provide a more effective utilization of the oxidant than a one-shot addition.

EXAMPLE 6

This example illustrates a continuous mode of operating the process of the present invention and simulates a single oxidizer stage of the three stage system shown in the drawing. A simulated bottoms from a denitrifier in a dinitrotoluene plant was prepared by diluting reagent 98 percent by wt. sulfuric acid to 70 percent by wt. with water and 100 ppm of a mixture of impurities comprising:

21 wt. % 2,4-dinitrotoluene
12 wt. % 4,6-dinitro-o-cresol
67 wt. % 2,6-dinitro-p-cresol.

The following equations were used to calculate the stoichiometric equivalents of the oxidants to use per equivalent of impurity:

$5C_7H_6N_2O_5 + 34NaClO_3 + 34H_2SO_4$
(dinitrocresols)

$35 CO_2 + 27H_2O + 10HNO_3 + 17Cl_2 + 34NaHSO_4$

Therefore, the stoichiometric equivalent of sodium chlorate as the oxidant equals:

$(34 \times 106.5)/(5 \times 198) = 3.66$ (g.$NaClO_3$)/(g. dinitrocresols)

The simulated acid was continuously pumped into a one liter flask fitted with an agitator and a sidearm through which treated acid overflowed into a receiver. The sodium chlorate solution was continuously pumped into the flask through a cooled tube extending below the surface of the acid. The contents of the flask were maintained at a temperature of 165°C, which is slightly below the boiling point of 70 percent sulfuric acid. The rate of addition of simulated stripped acid and sodium chlorate solution was varied as shown in Table IV. Contact time is defined as ratio of flow rate of acid to volume of acid held in the flask. The effluent acid was cooled to room temperature and anaylzed for total organic impurities by determination of the total carbon content of the solution.

TABLE IV

CONTINUOUS ADDITION OF $NaClO_3$

| Run | Equivalents of $NaClO_3$ (5 wt. % solution) per organic impurity | Contact time, hr. | Total amount of impurities in spent sulfuric acid[1] ppm |
|---|---|---|---|
| | 0 | 0 | 97 |
| 1 | 1.5 | ½ | 27.8 |
| 2 | 1.5 | 1 | 20.8 |
| 3 | 1.0 | ½ | 27.8 |
| 4 | 1.25 | ½ | 27.8 |

[1] Based on total amount of carbon in the sample and the assumption that the per cent carbon in the impurities is 43.2% by wt.

It is apparent from the foregoing description of the process of the present invention that the spent acid stream to be treated and the oxidant must be in intimate contact for the specified period of time to achieve the desired reduction in the organic impurities. While only certain means have been described herein to accomplish this step, any suitable agitation or mixing means can be used in the process of this invention.

What is claimed is:

1. In a system for the nitration of aromatic compounds, a process for purifying a spent acid stream from said system and containing organic impurities which comprises the steps of stripping said spent acid stream in a denitrifier to remove a substantial portion of the volatile organic impurities therefrom, contacting the resulting stripped spent acid stream containing at least 50 ppm of nonvolatile organic impurities selected from the group consisting of nitrocresols and other nitrophenolic compounds and from 60% to about 85% by weight of sulfuric acid from said denitrifier with an oxidizing agent selected from the group consisting of ozone, hydrogen peroxide, chlorates, peroxydisulfates and mixtures thereof by adding at least one stoichiometric equivalent in increments of about one-third or less of said oxidizing agent per equivalent of nonvolatile organic impurities during a period of about one minute to about 60 minutes at a temperature of about 130° to 230°C and recovering a purified acid stream containg less than 50 weight of said nonvolatile organic impurities than said stripped spent acid stream.

2. The process of claim 1 wherein said oxidizing agent is continuously added to said spent acid stream during the contacting step.

3. The process of claim 1 wherein the effluent from the contacting step is stripped to remove the volatile materials resulting from the oxidation of said organic impurities and then recovered as a purified acid stream containing less than 50 percent by weight of said impurities.

4. In a system for the nitration of toluene, a process for purifying a spent acid stream from said system and containing organic impurities which comprises the steps of stripping said spent acid stream in a denitrifier to remove s substantial portion of the volatile organic impurities, contacting the bottom containing at least 50 ppm of nonvolatile organic impurities selected from the group consisting of nitrocresols and other nitrophenolic compounds and from 60 percent to about 85 percent by weight of sulfuric acid from said denitrifier with an oxidizing agent selected from the group consisting of ozone, hydrogen peroxide, chlorates, peroxydisulfates and mixtures thereof by adding at least one stoichiometric equivalent in increments of about one-third or less of said oxidizing agent per equivalent of nonvolatile organic impurities during a period of about one mimute to about 60 minutes at a temperature of about 130° to 230°C and recovering a purified acid stream containing less than 50 percent by weight of said nonvolatile organic impurities than said bottoms.

5. The process of claim 4 wherein said oxidizing agent is continuously added to said spent acid stream during said contacting step.

6. The process of claim 4 wherein said spent acid stream has been continuously stripped in said denitrifier to remove a substantial portion of the volatile impurities therefrom prior to continuously contacting said stream with said oxidizing agent and continuously recovering said purified acid stream.

* * * * *